US012809307B2

(12) United States Patent
Boettcher et al.

(10) Patent No.: US 12,809,307 B2
(45) Date of Patent: Nov. 24, 2026

(54) HOLD DOWN ASSEMBLY FOR A DEVELOPER UNIT OF AN IMAGE FORMING DEVICE

(71) Applicant: LEXMARK INTERNATIONAL, INC., Lexington, KY (US)

(72) Inventors: Brian Lester Boettcher, Versailles, KY (US); Richard Louis Goin, Lexington, KY (US); Bartley Charles Gould, II, Lexington, KY (US); Brian Lee Hawes, Lexington, KY (US); Virgil Johnson, Jr., Versailles, KY (US); Glen Alan Reidhaar, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 19/027,098

(22) Filed: Jan. 17, 2025

(65) Prior Publication Data

US 2025/0231518 A1 Jul. 17, 2025

Related U.S. Application Data

(60) Provisional application No. 63/621,775, filed on Jan. 17, 2024, provisional application No. 63/621,778, filed on Jan. 17, 2024.

(51) Int. Cl.

*G03G 21/18* (2006.01)
*G03G 15/08* (2006.01)
*G03G 21/16* (2006.01)

(52) U.S. Cl.

CPC ..... *G03G 21/1821* (2013.01); *G03G 15/0875* (2013.01); *G03G 15/0896* (2013.01); *G03G 21/1676* (2013.01); *G03G 2215/068* (2013.01); *G03G 2221/163* (2013.01); *G03G 2221/1853* (2013.01)

(58) Field of Classification Search

CPC ........... G03G 21/1647; G03G 15/0875; G03G 21/1821; G03G 2221/163; G03G 2221/1654; G03G 2221/1815

See application file for complete search history.

(56) References Cited

U.S. PATENT DOCUMENTS 5,758,233 A 5/1998 Coffey et al.
6,678,489 B1 1/2004 Carter et al.
7,136,609 B2 11/2006 Askren et al.
7,831,168 B2 11/2010 Allen et al.

(Continued)

*Primary Examiner* — Sandra Brase

(57) ABSTRACT

A system for an electrophotographic image forming device includes a basket having a first side, a second side, and a positioning slot. The positioning slot is configured to receive a developer unit having a longitudinal dimension that extends along a length of the positioning slot from the first side to the second side when the developer unit is positioned in the positioning slot. A latch positioned at the first side of the basket is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket.

20 Claims, 13 Drawing Sheets

(56) References Cited

U.S. PATENT DOCUMENTS

| | | | | |
|---|---|---|---|---|
| 8,867,966 | B2 | 10/2014 | Acosta et al. | |
| 8,867,970 | B2 | 10/2014 | Acosta et al. | |
| 9,104,135 | B2 | 8/2015 | Hackney | |
| 9,285,758 | B1 | 3/2016 | Boettcher et al. | |
| 9,989,917 | B1 | 6/2018 | Hale et al. | |
| 10,175,643 | B1 | 1/2019 | Carpenter et al. | |
| 10,444,661 | B2 | 10/2019 | Cavill et al. | |
| 10,782,643 | B2 | 9/2020 | Amann et al. | |
| 10,809,661 | B1 | 10/2020 | Carpenter et al. | |
| 11,194,286 | B2 | 12/2021 | Amann et al. | |
| 2018/0088524 | A1* | 3/2018 | Ozawa ............... | G03G 21/1821 |
| 2019/0302681 | A1* | 10/2019 | Wang ................. | G03G 21/1647 |
| 2020/0142348 | A1* | 5/2020 | Amann ............. | G03G 21/1821 |

* cited by examiner

HOLD DOWN ASSEMBLY FOR A DEVELOPER UNIT OF AN IMAGE FORMING DEVICE

CROSS REFERENCES TO RELATED APPLICATIONS

This application claims priority to U.S. Provisional Patent Application Ser. No. 63/621,775, filed Jan. 17, 2024, entitled "Hold Down Assembly for a Developer Unit of an Image Forming Device" and to U.S. Provisional Patent Application Ser. No. 63/621,778, filed Jan. 17, 2024, entitled "Hold Down Assembly for a Developer Unit of an Image Forming Device," the contents of which are hereby incorporated by reference in their entirety.

BACKGROUND

1. Field of the Disclosure

The present disclosure relates generally to image forming devices and more particularly to hold down assemblies for a developer unit of an electrophotographic image forming device.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles from a developer roll are then electrostatically transferred to the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. Some image forming devices include a first replaceable unit in the form of a toner cartridge that holds a main toner supply of the image forming device and feeds toner through an outlet port of the toner cartridge to an inlet port of a second replaceable unit, sometimes referred to as an imaging unit or a developer unit. It is important that the replaceable units are rigidly held in place within the image forming device in order to prevent the positional alignment of the replaceable units from being disturbed during operation. For example, in the case of a single component development system, the developer roll in the developer unit contacts the photoconductive drum during the printing process. For good print quality, it is desired for the developer roll to be in uniform contact with a corresponding photoconductive drum of a photoconductor unit along the length of photoconductive drum's centerline. As a result, a mechanism that rigidly holds down the developer roll in place is desired.

SUMMARY

A system for an electrophotographic image forming device includes a basket having a first side, a second side, and a positioning slot. The positioning slot is configured to receive a developer unit having a longitudinal dimension that extends along a length of the positioning slot from the first side to the second side when the developer unit is positioned in the positioning slot. A latch positioned at the first side of the basket is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket. A spring-biased plunger is positioned at the end portion of the developer unit for receiving the hold-down force from the latch when the developer unit is positioned in the positioning slot and the latch is in the latched position.

Embodiments include those wherein the latch includes a hold-down member extending towards the positioning slot for applying the hold-down force on the end portion of the developer unit. The hold-down member is positioned on the latch such that the hold-down member applies the hold-down force in a linear direction that passes through the pivot axis when the developer unit is positioned in the positioning slot and the latch is in the latched position. In some embodiments, the hold-down member is positioned along a vertical insertion path of the developer unit that is orthogonal to the longitudinal dimension when the latch is in the latched position, and the hold-down member is clear of the vertical installation path of the developer unit when the latch is in the unlatched position.

Embodiments include those wherein the latch includes a handle extending away from the positioning slot for receiving a user-applied force for actuating the latch. In some embodiments, the handle is offset from the hold-down member relative to a rotational direction of motion of the latch to provide a moment arm such that a moment force is generated to facilitate release of the latch from the latched position to the unlatched position when the handle receives the user-applied force. In some embodiments, an insertion path of a toner cartridge configured to supply toner to the developer unit is positioned above the positioning slot, and the handle blocks the insertion path preventing installation of the toner cartridge into the image forming device when the latch is in the unlatched position and the handle is clear of the insertion path permitting installation of the toner cartridge into the image forming device when the latch is in the latched position.

A system for an electrophotographic image forming device according to another example embodiment includes a basket having a first side, a second side, and a positioning slot. The positioning slot is configured to receive a developer unit having a longitudinal dimension that extends along a length of the positioning slot from the first side to the second side when the developer unit is positioned in the positioning slot. The positioning slot is configured to receive the developer unit along a vertical insertion path of the developer unit into the positioning slot that is orthogonal to the longitudinal dimension. A latch positioned at the first side of the basket is movable between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket. A spring-biased plunger is positioned at the end portion of the developer unit for contacting the latch and receiving the hold-down force from the latch when the developer unit is positioned in the positioning slot and the latch is in the latched position. A portion of the latch is positioned along the vertical insertion path of the developer unit when the latch is in the latched position and the portion of the latch is clear of the vertical installation path of the developer unit when the latch is in the unlatched position.

Embodiments include those wherein the portion of the latch extends toward the positioning slot for applying the hold-down force on the end portion of the developer unit when the developer unit is positioned in the positioning slot and the latch is in the latched position. In some embodiments, the latch is pivotable between the latched position and the unlatched position about a pivot axis. In some embodiments, the portion of the latch is positioned on the latch such that the portion applies the hold-down force in a linear direction that passes through the pivot axis when the developer unit is positioned in the positioning slot and the latch is in the latched position.

Embodiments include those wherein the latch includes a handle extending away from the positioning slot for receiving a user-applied force for actuating the latch. In some embodiments, the handle is offset from the portion of the latch relative to a direction of motion of the latch to provide a moment arm such that a moment force is generated to facilitate release of the latch from the latched position to the unlatched position when the handle receives the user-applied force. In some embodiments, an insertion path of a toner cartridge configured to supply toner to the developer unit is positioned above the positioning slot, and the handle blocks the insertion path preventing installation of the toner cartridge into the image forming device when the latch is in the unlatched position and the handle is clear of the insertion path permitting installation of the toner cartridge into the image forming device when the latch is in the latched position.

A system for an electrophotographic image forming device according to another example embodiment includes a basket having a first side, a second side, and a positioning slot. The positioning slot is configured to receive a developer unit having a longitudinal dimension that extends along a length of the positioning slot from the first side to the second side when the developer unit is positioned in the positioning slot. A latch positioned at the first side of the basket is movable between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket. An insertion path of a toner cartridge configured to supply toner to the developer unit is positioned above the positioning slot. A portion of the latch blocks the insertion path preventing installation of the toner cartridge into the image forming device when the latch is in the unlatched position and the portion of the latch is clear of the insertion path permitting installation of the toner cartridge into the image forming device when the latch is in the latched position.

Embodiments include those wherein a spring-biased plunger is positioned at the end portion of the developer unit for receiving the hold-down force from the latch when the developer unit is positioned in the positioning slot and the latch is in the latched position.

Embodiments further include those wherein the latch includes a hold-down member extending towards the positioning slot for applying the hold-down force on the end portion of the developer unit when the developer unit is positioned in the positioning slot and the latch is in the latched position. In some embodiments, the hold-down member is positioned along a vertical insertion path of the developer unit into the positioning slot that is orthogonal to the longitudinal dimension when the latch is in the latched position and the hold-down member is clear of the vertical installation path of the developer unit when the latch is in the unlatched position.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
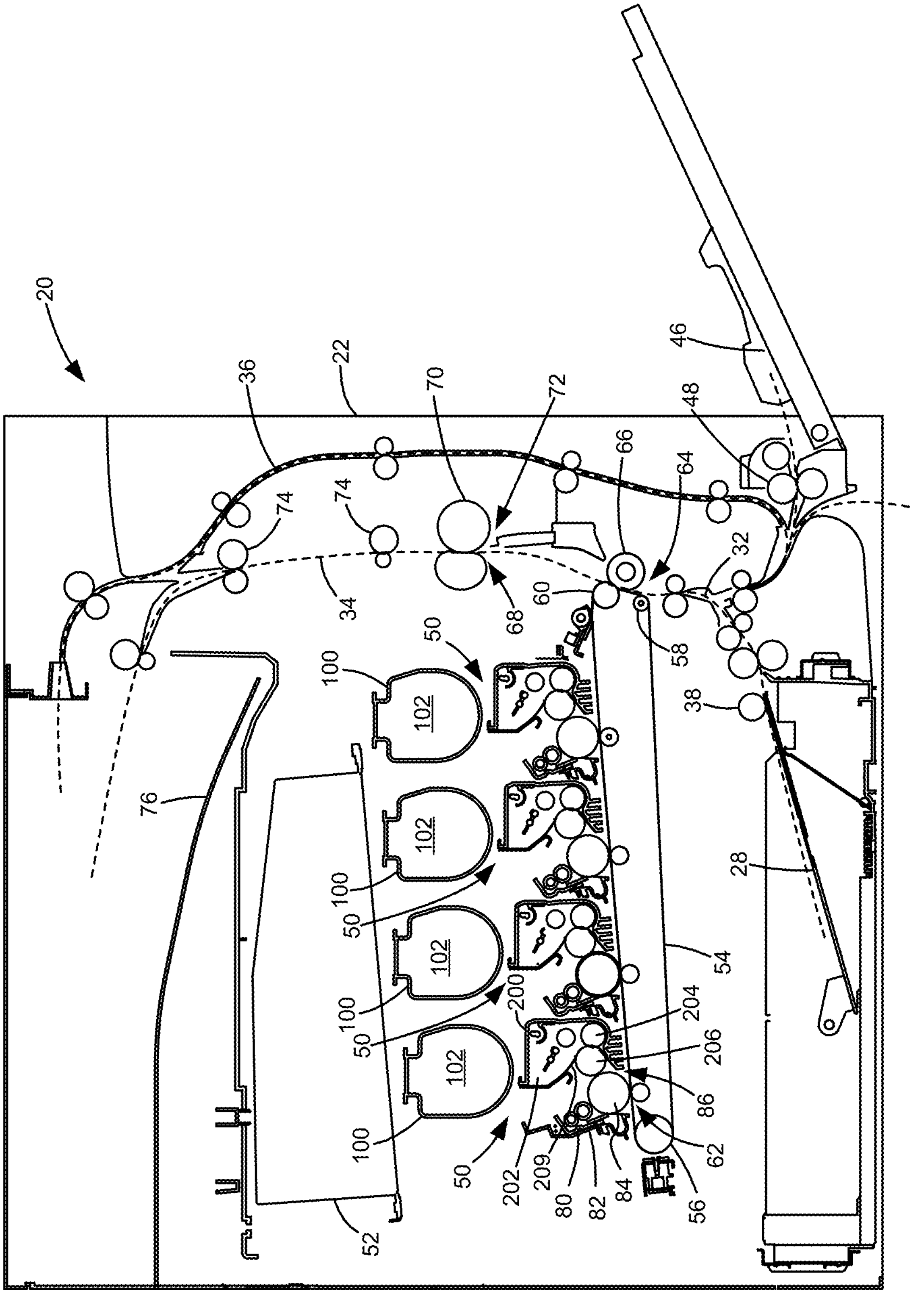
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductor unit (PC unit) 80. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. Each PC unit 80 includes a charging roll 82 and a photoconductive (PC) drum 84 for each imaging station 50. PC drums 84 are mounted substantially parallel to each other. For purposes of clarity, developer unit 200 and PC unit 80 are labeled on only one of the imaging stations 50 in FIG. 1. In the example embodiment illustrated, each imaging station 50 is substantially the same except for the color or type of toner contained therein.

Each charging roll 82 forms a nip with the corresponding PC drum 84. During a print operation, charging roll 82 charges the outer surface of PC drum 84 to a specified voltage. A laser beam from a printhead 52 associated with each imaging station 50 is then directed to the outer surface of PC drum 84 and selectively discharges those areas it contacts to form a latent image. Developer roll 206 then transfers toner to PC drum 84 to form a toner image. A metering device, such as a doctor blade 209, may be used to meter toner on the outer surface of developer roll 206 and apply a desired charge to the toner prior to its transfer to PC drum 84. Toner on developer roll 206, which forms a nip 86 with PC drum 84, is attracted to the areas of the outer surface of PC drum 84 discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 84 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 84.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20, which may include multiple imaging stations 50.

Figure 2:
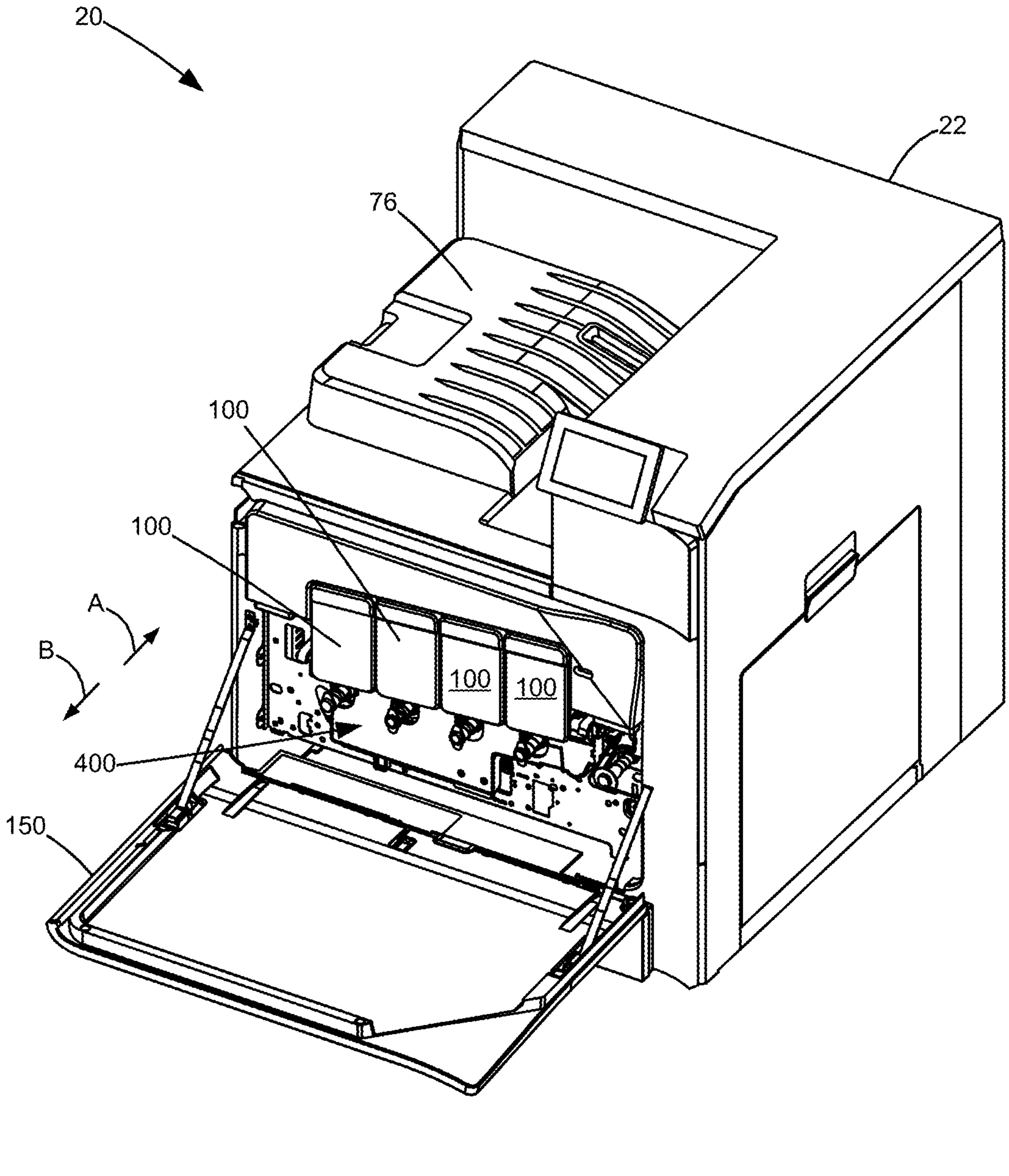
FIG. 2 is a perspective view of the image forming device shown in FIG. 1 with a front access door opened to expose toner cartridges and an imaging basket according to one example embodiment.

FIG. 2 illustrates an example of image forming device 20 having housing 22 with an access door 150 in a lowered, open position exposing interior components of image forming device 20, such as toner cartridges 100 and an imaging basket 400. Imaging basket 400 is configured to receive and support four developer units 200 in image forming device 20. In the embodiment illustrated, developer units 200 are disposed in imaging basket 400 and are thus obscured from view in FIG. 2. Toner cartridges 100 and imaging basket 400 are slidable into and out of housing 22 along sliding directions A, B. In the embodiment illustrated, when installing toner cartridges 100, imaging basket 400 (with developer units 200 installed in imaging basket 400) is first inserted into image forming device 20 followed by toner cartridges 100 in direction A. When removing imaging basket 400, toner cartridges 100 are first slidably removed from image forming device 20 followed by imaging basket 400 in direction B. In this embodiment, each of the four toner cartridges 100 is substantially the same except for the color of the toner contained therein, and each of the four developer units 200 is substantially the same except for the color of the toner contained therein. In some embodiments, one or more developer units 200 may be fixed to its corresponding PC unit 80 such that the integrated developer unit 200 and PC unit 80 is removably installable in imaging basket 400 as a single unit.

Figure 3:
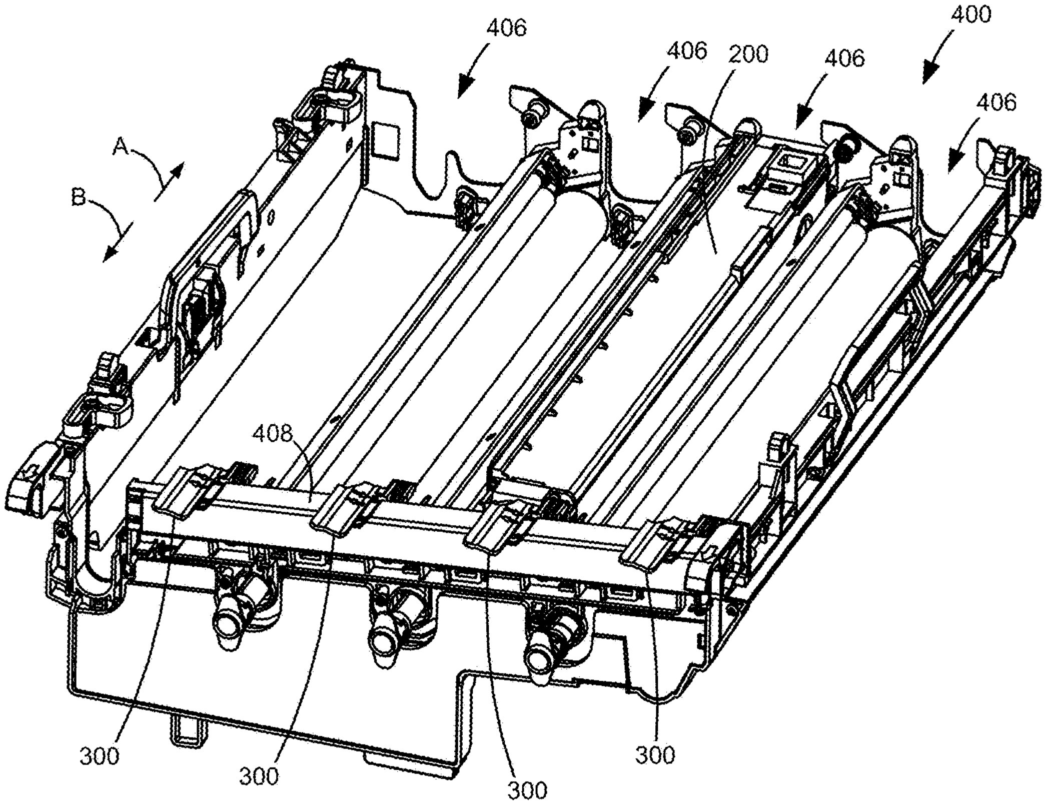
FIGS. 3 and 4 are perspective views of the imaging basket shown in FIG. 2 holding one developer unit according to one example embodiment.
Figure 4:
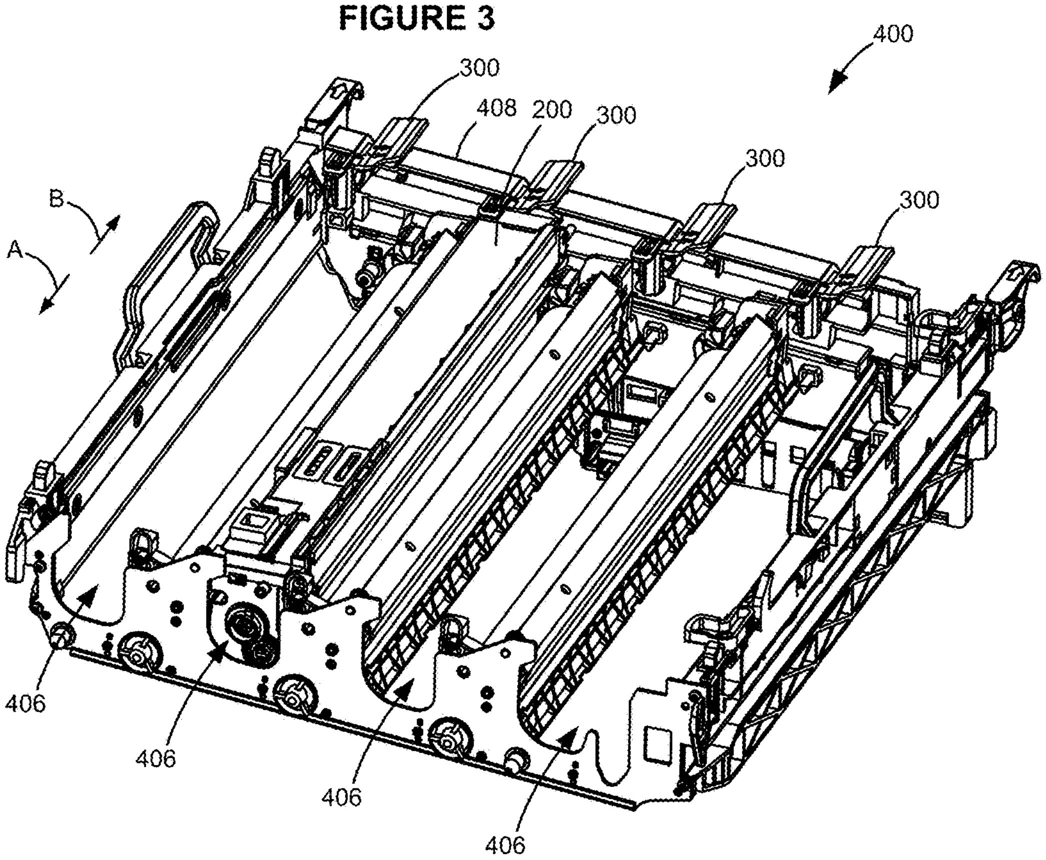

FIGS. 3 and 4 show imaging basket 400 removed from image forming device 20 with one developer unit 200 installed and three developer units removed. In the example embodiment illustrated, four positioning slots 406 are configured to receive four corresponding developer units 200 of image forming device 20. Developer units 200 are vertically insertable into and removable from the four corresponding positioning slots 406 of imaging basket 400 when imaging basket 400 is removed from image forming device 20. Positioning slots 406 of imaging basket 400 locate developer units 200 in their operating positions within image forming device 20 when developer units 200 are installed in imaging basket 400 and imaging basket 400 is fully inserted into image forming device 20.

Figure 5A:
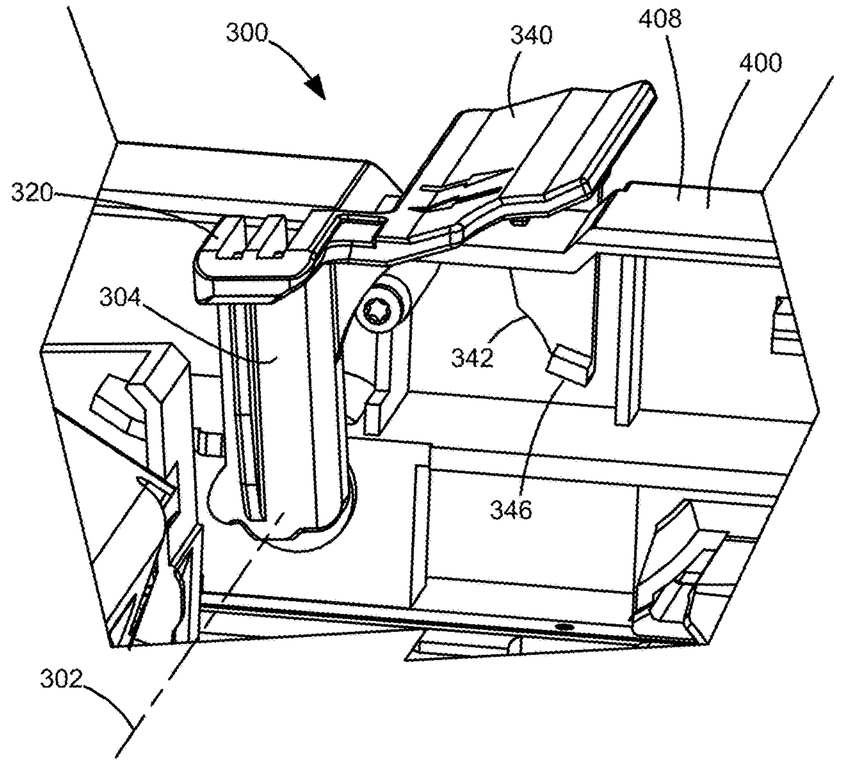
FIGS. 5A and 5B are perspective views showing a latch on the imaging basket in a latched position and an unlatched position, respectively, according to one example embodiment.

In the example embodiment illustrated, each positioning slot 406 includes a respective latch 300 that secures a corresponding developer unit 200 in imaging basket 400. Latch 300 is positioned at a front end 408 of the positioning slot 406 proximate to one end of the corresponding developer unit 200. In the example embodiment illustrated, each latch 300 is manually movable between a latched position (see FIG. 5A) and an unlatched position (see FIG. 5B) permitting a user to selectively secure a particular developer unit 200 to imaging basket 400 or remove a particular developer unit 200 from imaging basket 400. In this embodiment, latches 300 are pivotable between their latched and unlatched positions about respective pivot axes 302 that run along sliding directions A, B of imaging basket 400. Latches 300, however, may move in other manners as desired. In the example embodiment illustrated, imaging basket 400 is inserted into image forming device 20 in the direction indicated by arrow A with latches 300 trailing and removed from image forming device 20 in the direction indicated by arrow B with latches 300 leading.

Figure 6:
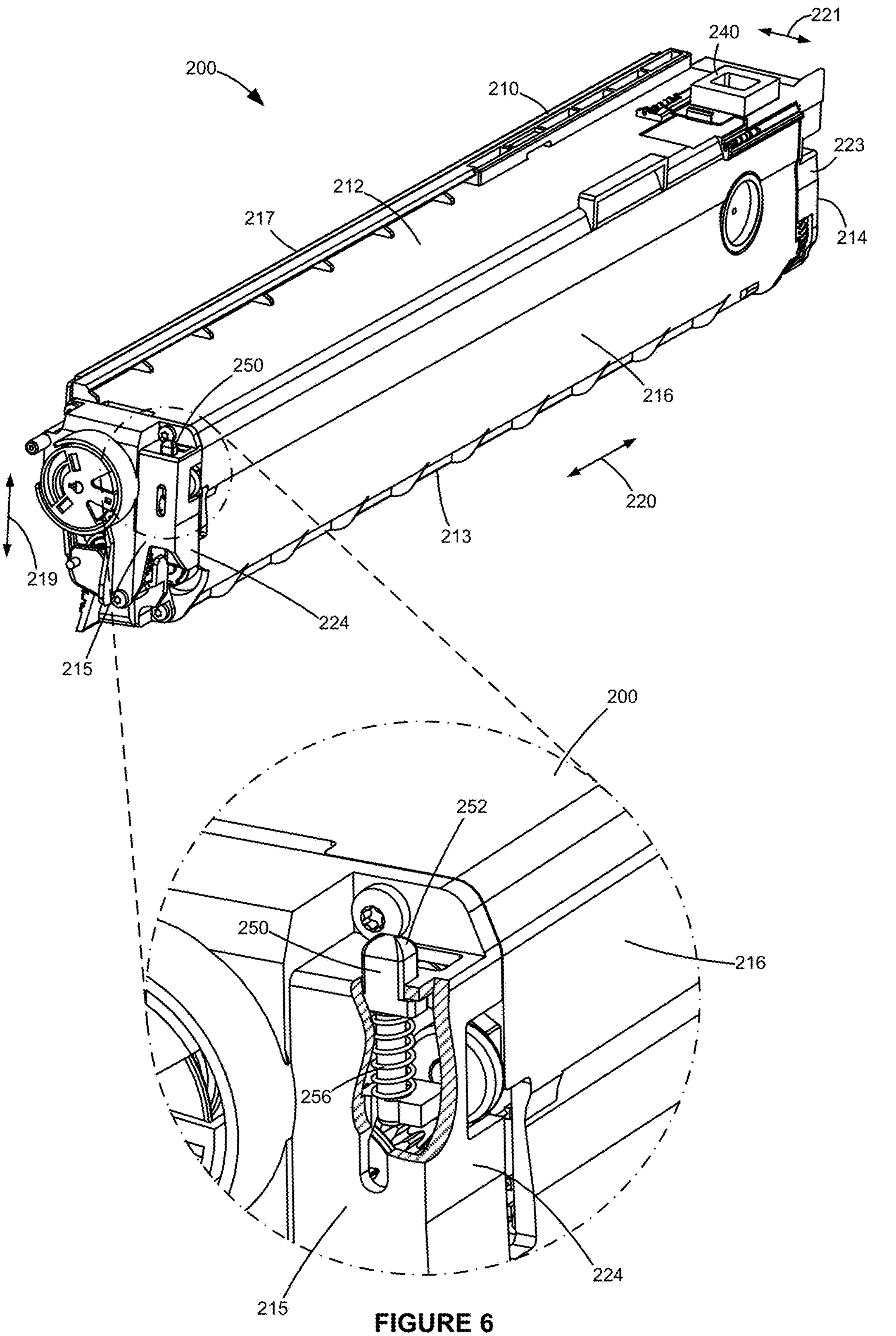
FIG. 6 is a perspective view of the developer unit shown in FIGS. 3 and 4 according to one example embodiment.

FIG. 6 shows developer unit 200 according to one example embodiment. Developer unit 200 includes a body 210 housing toner reservoir 202 (FIG. 1) therein. Body 210 includes a top 212, a bottom 213, a first end 214, a second end 215 and a pair of sides 216, 217. Body 210 has a height measured along a vertical dimension 219 of developer unit 200 between top 212 and bottom 213, a length measured along a longitudinal dimension 220 of developer unit 200 orthogonal to vertical dimension 219 between end 214 and end 215, and a width measured along a side-to-side dimension 221 of developer unit 200 orthogonal to vertical dimension 219 and longitudinal dimension 220 between side 216 and side 217. Developer unit 200 includes an inlet port 240 positioned to receive toner from an outlet port of toner cartridge 100 to replenish reservoir 202 as toner is consumed from reservoir 202 by the printing process. In the example embodiment illustrated, inlet port 240 is positioned on top 212 of body 210 near first end 214.

In the example embodiment illustrated, each end 214, 215 of body 210 includes a respective end cap 223, 224 mounted on a corresponding end wall at each end 214, 215, such as by suitable fasteners (e.g., screws, rivets, etc.) or by a snap-fit engagement. In this embodiment, the end walls at ends 214, 215 along with top 212, bottom 213 and sides 216, 217 form toner reservoir 202. A drive coupler (not shown) is exposed on an outer portion of first end 214 in position to receive rotational force from a corresponding drive system in image forming device 20 when developer unit 200 is installed in image forming device 20 to drive rotatable components of developer unit 200 including, for example, toner adder roll 204 and developer roll 206, to rotate toner adder roll 204 and developer roll 206 upon receiving rotational force from the corresponding drive system in image forming device 20. The drive system in image forming device 20 may include one or more drive motors and a drive transmission from the drive motor(s) to a drive coupler that mates with the drive coupler of developer unit 200 when developer unit 200 is installed in image forming device 20.

Developer unit 200 includes a plunger 250 positioned at second end 215 of developer unit 200. In the embodiment illustrated, plunger 250 includes a plunger head 252 that projects upward from end cap 224 to receive a downward hold-down force from another feature or component of image forming device 20 for securing developer unit 200 in imaging basket 400, as discussed below. Plunger 250 is biased by a biasing member 256 to provide a reaction force against the hold-down force applied to plunger 250. In the example embodiment illustrated, biasing member 256 includes a compression spring; however, any suitable biasing member may be used as desired, such as, for example, an extension spring, a torsion spring, a leaf spring or a material having resilient properties. In the example embodiment illustrated, plunger 250 is translatable vertically, along a biasing direction of biasing member 256; however, plunger 250 may be directly or indirectly biased according to any suitable method as desired.

Figure 5B:
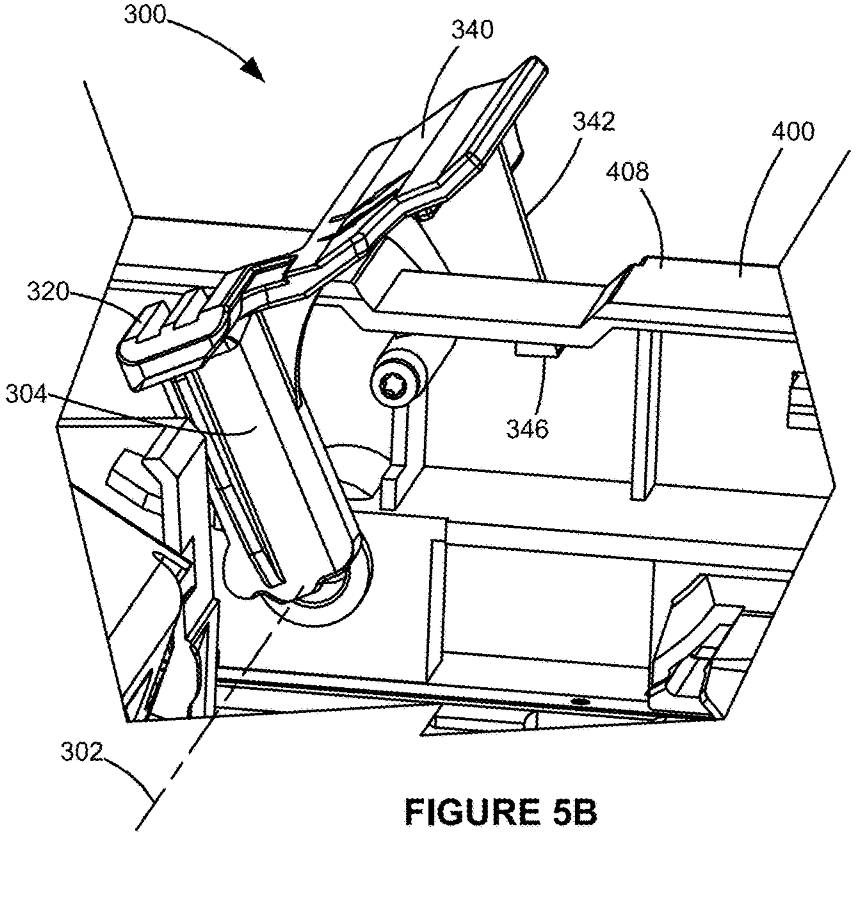
Figure 7:
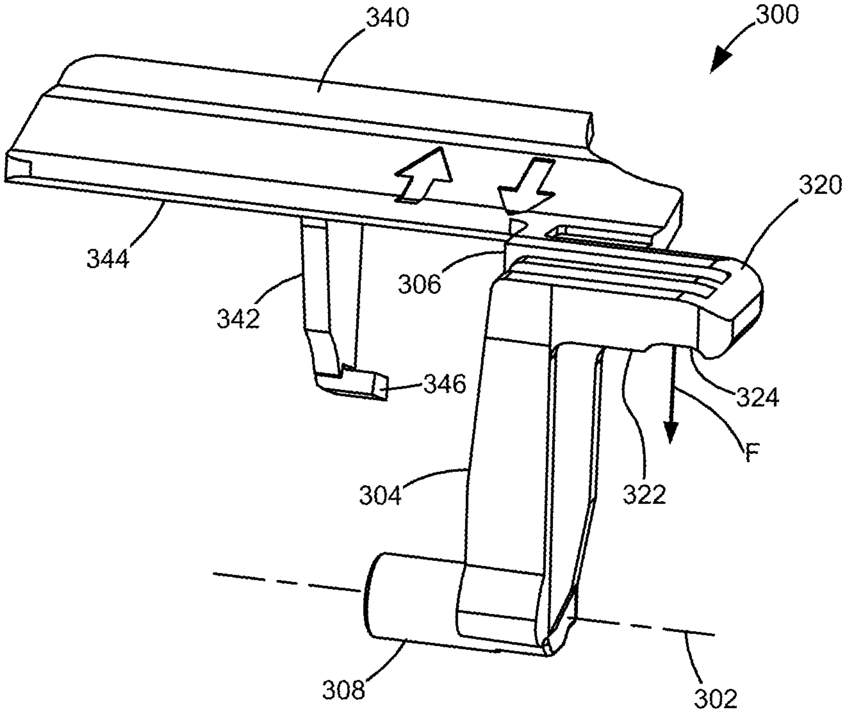
FIGS. 7 and 8 are perspective views of the latch shown in FIGS. 5A and 5B according to one example embodiment.
Figure 8:
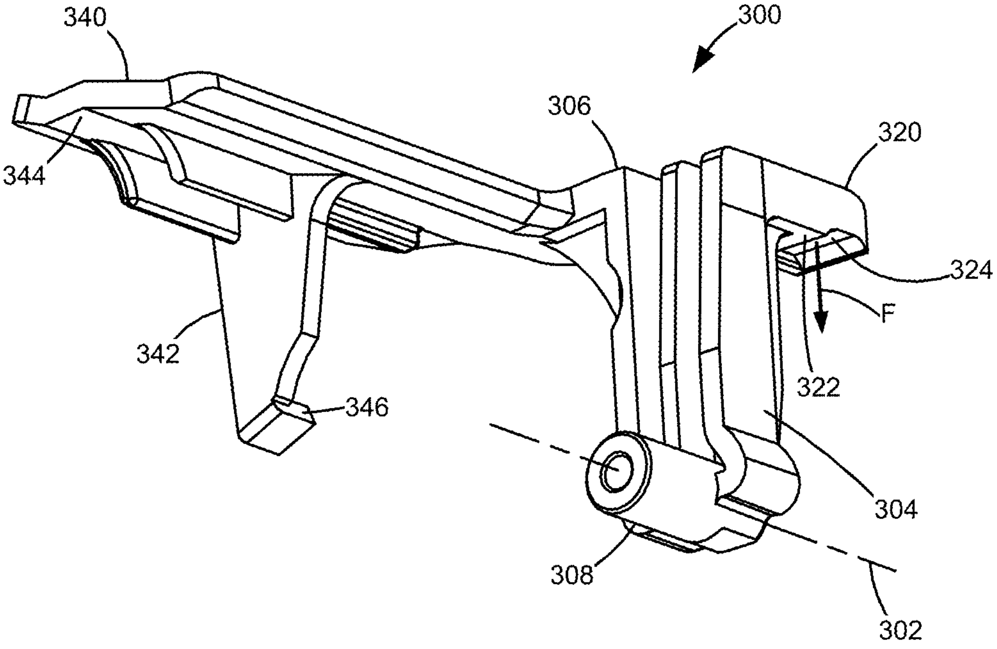

FIGS. 7 and 8 are perspective views showing latch 300 according to one example embodiment. Each latch 300 is pivotable about a respective pivot axis 302 between the latched position shown in FIG. 5A to retain and hold down developer unit 200 in the operational position and an unlatched position shown in FIG. 5B to disengage and release developer unit 200. In the embodiment illustrated, latch 300 includes a neck portion 304 extending from pivot axis 302. A hold-down 320 and a handle 340 extend from a distal end 306 of neck portion 304. In the embodiment illustrated, hold-down 320 extends in a direction toward positioning slot 406 while handle 340 extends in a direction away from positioning slot 406. Hold-down 320 has a bottom face 322 defining an engagement surface 324 for engaging plunger 250 when developer unit 200 is installed in positioning slot 406 and latch 300 is rotated in the latched position. In the embodiment illustrated, engagement surface 324 is formed by a cavity that is shaped and sized to receive and secure plunger 250 against hold-down 320. Handle 340 is positioned to receive a user-applied force to rotate latch 300 between the latched position and the unlatched position. An arm 342 extends downward from a bottom surface 344 of handle 340. Arm 342 includes a tab 346 that serves as a rotational stop for engaging a portion of front end 408 of imaging basket 400 to limit rotational movement of latch 300 towards the unlatched position as shown in FIG. 5B.

In the example embodiment illustrated, hold-down 320 on latch 300 is positioned to engage plunger 250 in such a way that substantially no moment force on latch 300 along the direction of rotational motion of latch 300 between the latched position and the unlatched position is generated when latch 300 is in the latched position. For example, hold-down 320 is positioned on latch 300 such that hold-down 320 at distal end 306 of neck portion 304 and a pivot boss 308 positioned about pivot axis 302 are aligned along the length of neck portion 304. In this manner, hold-down 320 can apply a linear force F in a direction towards pivot axis 302 when a force is applied against engagement surface 324 of hold-down 320 in the opposite direction, such as when plunger 250 engages hold-down 320 from below when hold-down 320 is in the latched position, as discussed below.

In the example embodiment illustrated, handle 340 is positioned at distal end 306 of neck portion 304 opposite pivot boss 308 and is oriented at an angle from, such as perpendicular to, neck portion 304. In one example embodiment, handle 340 is positioned to provide a moment arm to introduce a moment force for facilitating release of latch 300 from the latched position. For example, in the embodiment illustrated, handle 340 is positioned on latch 300 at a location that is offset from pivot boss 308 and hold-down 320 relative to neck portion 304 to create a lever arm relative to pivot boss 308. In this manner, when handle 340 is operated by a user, the force applied to handle 340 by the user can generate a moment about pivot boss 308 due to the perpendicular distance between the line of action of the applied force and the pivot point to aid in the release of latch 300.

Figure 9A:
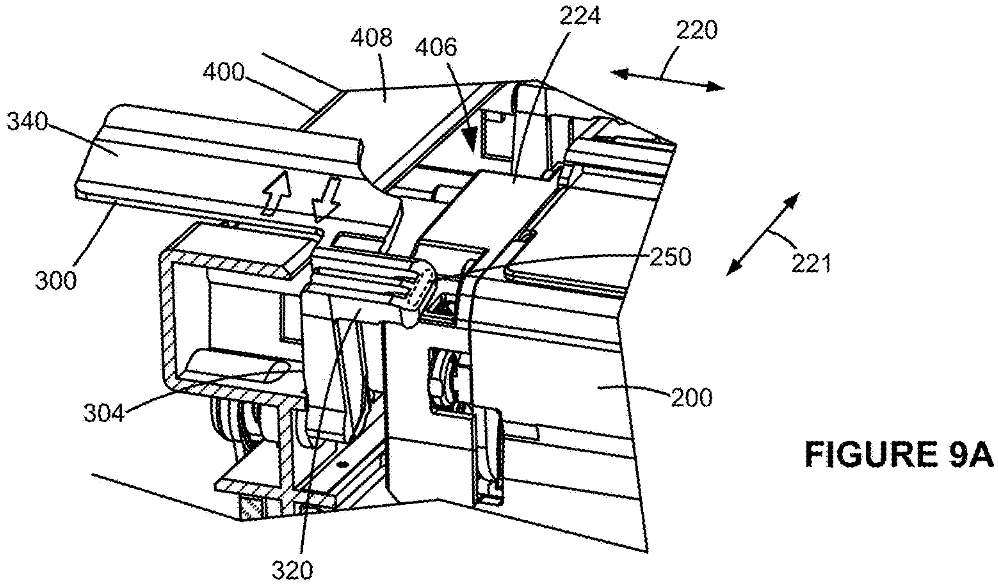
FIG. 9A is a perspective view showing the latch shown in FIGS. 7 and 8 in the unlatched position relative to the developer unit according to one example embodiment.
Figure 9B:
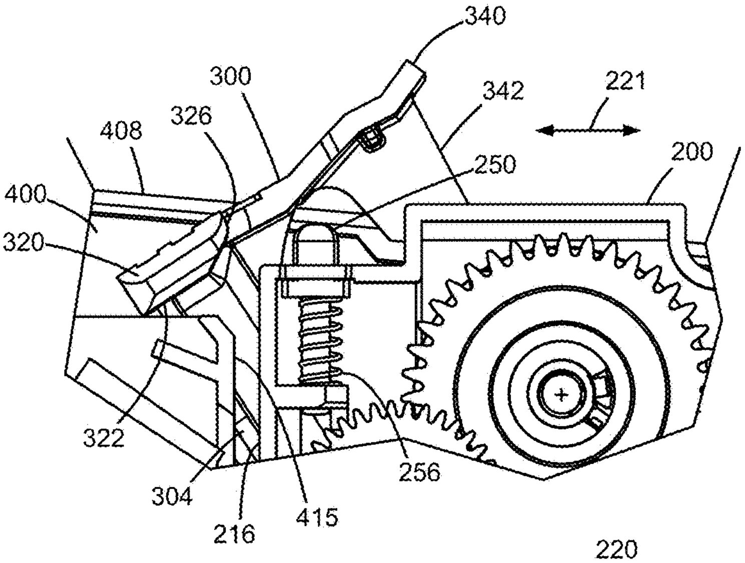
FIG. 9B is a section elevation view showing the latch shown in FIGS. 7 and 8 in the unlatched position relative to the developer unit according to one example embodiment.
Figure 9C:
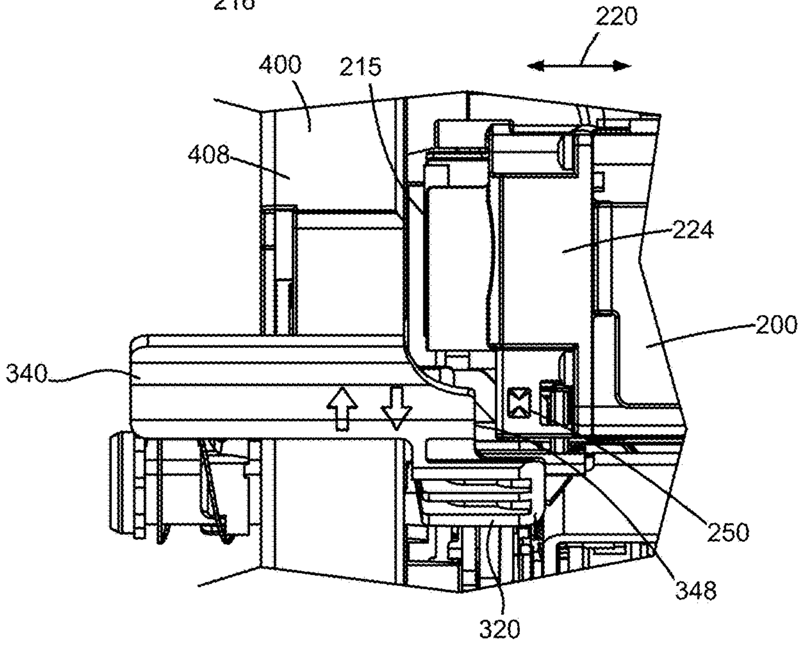
FIG. 9C is a top view showing the latch shown in FIGS. 7 and 8 in the unlatched position relative to the developer unit according to one example embodiment.
Figure 10A:
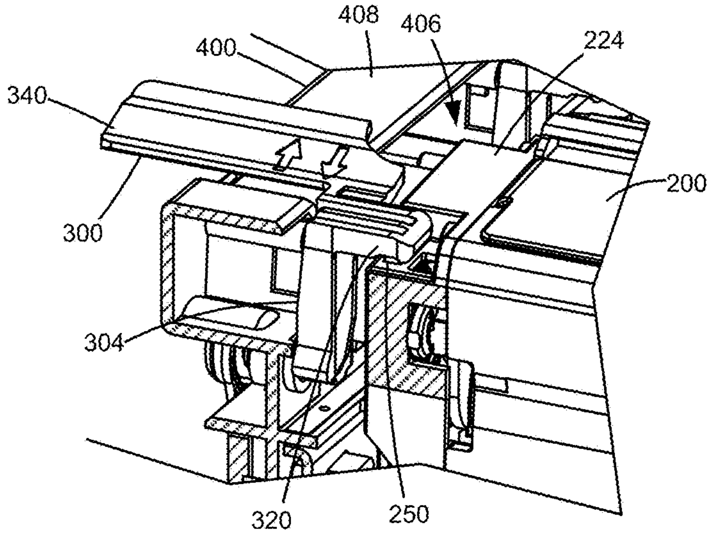
FIG. 10A is a perspective view showing the latch shown in FIGS. 7 and 8 in the latched position relative to the developer unit according to one example embodiment.
Figure 10B:
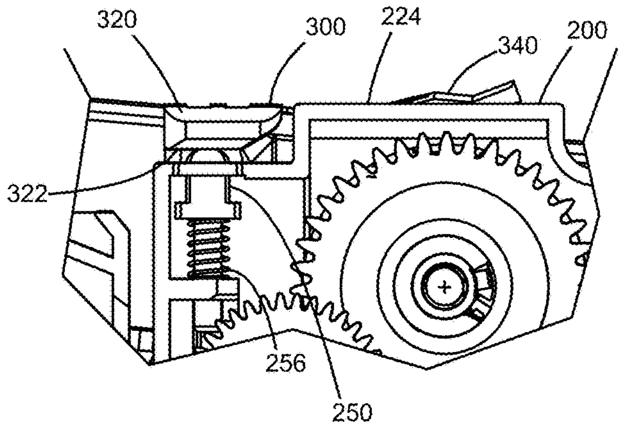
FIG. 10B is a section elevation view showing the latch shown in FIGS. 7 and 8 in the latched position relative to the developer unit according to one example embodiment.
Figure 10C:
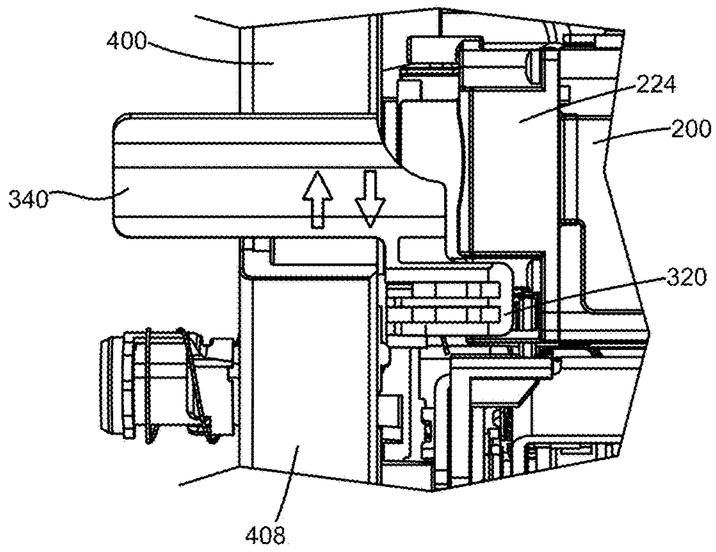
FIG. 10C is a top view showing the latch shown in FIGS. 7 and 8 in the latched position relative to the developer unit according to one example embodiment.

FIGS. 9A-10C show the operation of latch 300 with developer unit 200 positioned in a corresponding positioning slot 406 of imaging basket 400. FIGS. 9A-9C show latch 300 in the unlatched position while FIGS. 10A-10C show latch 300 in the latched position. In FIG. 9A, plunger 250 is obscured by hold-down 320 of latch 300 and is shown in broken line.

When latch 300 is in the unlatched position, hold-down 320 is rotated in a direction away from plunger 250 such that hold-down 320 is positioned clear of the installation path of developer unit 200 allowing developer unit 200 to be vertically removed from or installed in a corresponding positioning slot 406 of imaging basket 400. In the embodiment illustrated in FIG. 9B, hold-down 320 of latch 300 is laterally spaced from side 216 of developer unit 200 along side-to-side dimension 221. In the embodiment illustrated in FIG. 9C, inner edge 348 of handle 340 is spaced from second end 215 of developer unit 200 along longitudinal dimension 220. As a result, latch 300 swings completely out of the extraction and installation path of developer unit 200 (which is in a direction into the page as viewed in FIG. 9C) when latch 300 is in the unlatched position.

In one example embodiment, the clearance between latch 300 and developer unit 200 when latch 300 is in the unlatched position is greater than the clearance between other surfaces adjacent to developer unit 200 such that no impedance or obstruction to the removal or installation of developer unit 200 may be caused by latch 300. For example, in the embodiment shown in FIG. 9B, an inner edge surface 326 of hold-down 320 of latch 300 is offset from an adjacent surface 415 such that the clearance between hold-down 320 of latch 300 and developer unit 200 is greater than the clearance between the adjacent surface 415 and developer unit 200. The same may be applied to inner edge 348 of handle 340 relative to surfaces that are adjacent to end cap 224.

When latch 300 is in the latched position, hold-down 320 of latch 300 depresses plunger 250 on developer unit 200 and applies a downward hold-down force to plunger 250 as shown in FIG. 10A. In FIG. 10B, biasing member 256 is compressed causing plunger 250 to retract into end cap 224 of developer unit 200. In the embodiment illustrated, hold-down 320 of latch 300 vertically aligns with plunger 250. In this example, the downward force applied by hold-down 320 on plunger 250 aligns with the biasing direction of biasing member 256 such that no rotational or moment force is generated along the rotational direction of motion of latch 300 when latch 300 is in the latched position allowing hold-down 320 to lock in place against plunger 250. In this manner, the force applied by hold-down 320 to plunger 250 aids in preventing second end 215 of developer unit 200 from shifting vertically during operation of developer unit 200 in image forming device 20.

In the example embodiment illustrated, contact between hold-down 320 of latch 300 and spring-biased plunger 250 on developer unit 200 results in a downward hold-down force on plunger 250 that aids in keeping most of the hold-down force from directly acting on body 210 of developer unit 200. As a result, the net load applied to developer unit 200 by latch 300 is reduced. In addition, the use of plunger 250 prevents unwanted forces, such as impacts and vibrations, from being directly transmitted to developer unit 200. For example, biasing member 256 may compress or extend to absorb and reduce the effects of movements or vibrations on developer unit 200.

To release latch 300 from the latched position to the unlatched position, a user-applied force is used to lift handle 340 to generate torque (due to the moment arm which is the perpendicular distance from pivot axis 302 to the line of action of the user-applied force) causing latch 300 to rotate away from plunger 250. When hold-down 320 of latch 300 initially rotates away from plunger 250, plunger 250 also pushes back hold-down 320 due to the spring force of biasing member 256 until hold-down 320 disengages from plunger 250. Latch 300 is rotated to its final unlatched position when latch 300 rotationally stops upon tab 346 on arm 342 of latch 300 engaging the corresponding portion on front end 408 of imaging basket 400 as shown in FIG. 5B.

Figure 11A:
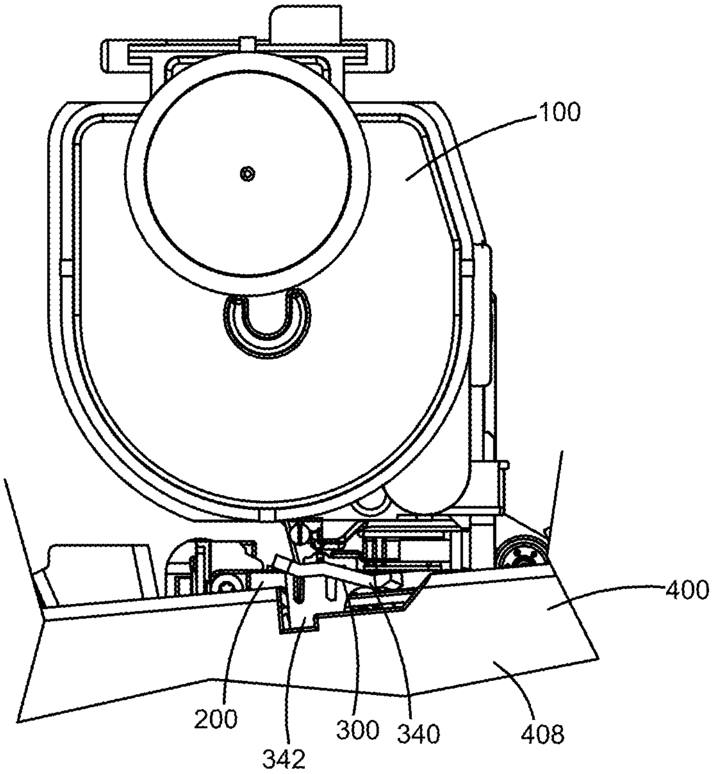
FIGS. 11A and 11B are elevation views showing the latch relative to a toner cartridge when the latch is in the latched position and the unlatched position, respectively.
Figure 11B:
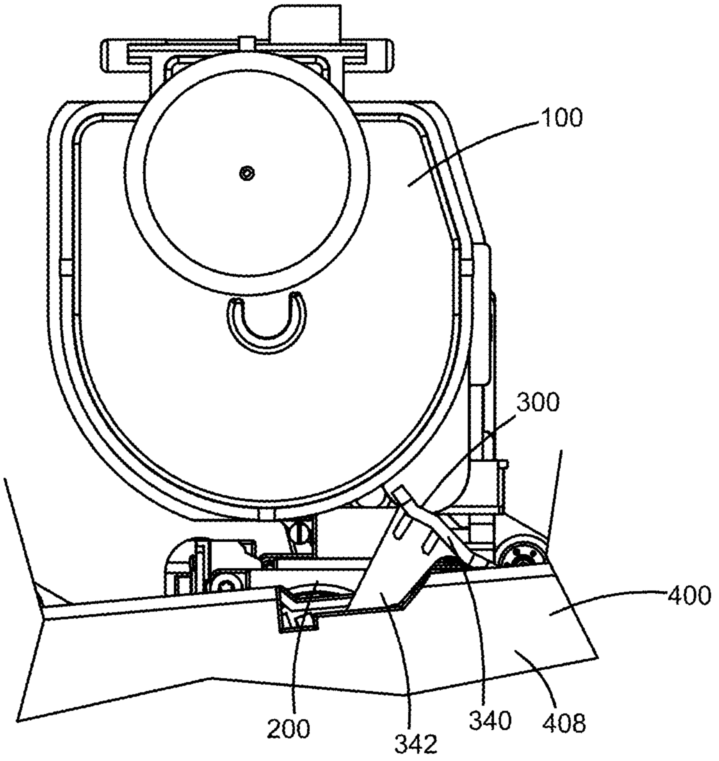

FIGS. 11A and 11B show latch 300 relative to toner cartridge 100 when latch 300 is in the latched position and the unlatched position, respectively. When latch 300 is in the latched position shown in FIG. 11A, latch 300 folds out of the path of toner cartridge 100, allowing insertion of toner cartridge 100 into image forming device 20. When latch 300 is in the unlatched position shown in FIG. 11B, latch 300 blocks the insertion path of toner cartridge 100. In this manner, latch 300 prevents the insertion of toner cartridge 100 if developer unit 200 is unlatched by latch 300. In other embodiments, the finger contact surface of latch 300, or a dedicated part for the same purpose as handle 340, may be used to block the insertion path of toner cartridge 100 when developer unit 200 below toner cartridge 100 is not latched down. In this example, an indication or feedback may be provided to the user about a possible issue in image forming device 20 that may need to be addressed.

The above example embodiments provide a more stable hold-down force of developer unit 200 in comparison with assemblies that include hold downs applied to the developer unit 200 by the toner cartridge since the reaction force is not against a positionally compliant supply item remote from the developer unit within the image forming device beyond the imaging basket, such as the toner cartridge. In addition, there is no residual vertical hold-down force pushing toner cartridge 100 upward in an undesirable manner, which would interfere with aesthetics, tactile feedback during installation, and proper functioning of toner cartridge 100. Further, the example embodiments permit developer units 200 to be easily dropped straight down and lifted out of their corresponding positioning slots 406 in imaging basket 400 with ample clearance by latches 300 folding out of the developer unit installation path, further than neighboring surfaces of imaging basket 400 or adjacent developer units 200. The example embodiments also achieve a more uniform hold down force regardless of part manufacturing, assembly and module placement tolerances within image forming device 20 because of the spring-biased plunger 250 on developer unit 200.

In the above example embodiments, latch 300 on imaging basket 400 is used to depress plunger 250 on developer unit 200 in order to hold-down and secure second end 215 of developer unit 200 against corresponding datums in imaging basket 400. In other embodiments, plunger 250 on developer unit 200 may be depressed by other features or components in image forming device 20 to hold down developer unit 200. For example, toner cartridge 100 may include one or more features for engaging plunger 250 of developer unit 200 to hold-down second end 215 of developer unit 200 against imaging basket 400.

Figure 12:
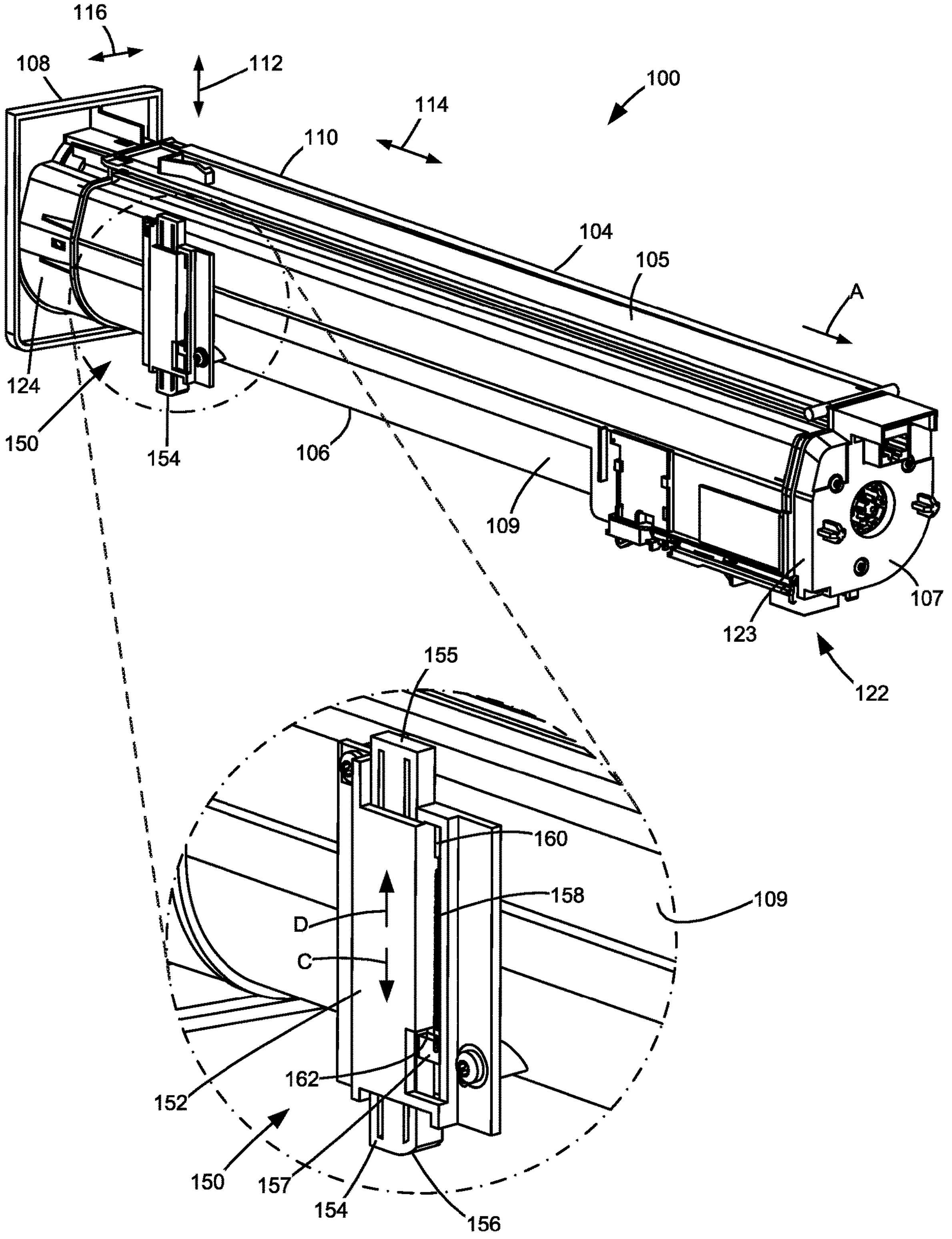
FIG. 12 is a perspective view of a toner cartridge including a hold-down mechanism according to one example embodiment.

FIG. 12 shows toner cartridge 100 according to one example embodiment. In the example embodiment illustrated, toner cartridge 100 includes a body 104 housing toner reservoir 102 (FIG. 1) therein. Body 104 includes a top 105, a bottom 106, a first end 107, a second end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between first end 107 and second end 108, and a width measured along a side-to-side dimension 116 of toner cartridge 100 orthogonal to vertical dimension 112 and longitudinal dimension 114 between side 109 and side 110. In the example embodiment illustrated, each end 107, 108 of body 104 includes a respective end cap 123, 124 mounted on a corresponding end wall, such as by suitable fasteners (e.g., screws, rivets, etc.) or by a snap-fit engagement. Toner cartridge 100 includes an outlet port 122 for exiting toner from reservoir 102, such as when transferring toner to inlet port 240 of developer unit 200. In the example embodiment illustrated, toner cartridge 100 is inserted into image forming device 20 generally along longitudinal dimension 114 in the direction indicated by arrow A with first end 107 of body 104 leading and second end 108 of body 104 trailing.

In the embodiment illustrated, toner cartridge 100 includes a hold-down mechanism 150 positioned on side 109 of body 104. Hold-down mechanism 150 includes an engagement arm 154 for applying a hold-down force on plunger 250 of developer unit 200 when toner cartridge 100 is inserted into image forming device 20. In the embodiment illustrated, engagement arm 154 has an upper end surface 155 for receiving a force for driving engagement arm 154 downward and a lower end surface 156 forming a wedge for engaging plunger 250 on developer unit 200 when engagement arm 154 is driven downward upon upper end surface 155 receiving a downward force. In the embodiment illustrated, lower end surface 156 of engagement arm 154 is tapered upward from a bottom end of engagement arm 154 in a direction toward first end 107 of toner cartridge 100. Lower end surface 156 is unobstructed such that lower end surface 156 contacts plunger 250 positioned along the insertion path of lower end surface 156 when toner cartridge 100 is inserted into image forming device 20, as discussed below. A sleeve 152 retains engagement arm 154 on side 109 of body 104 and supports the sliding motion of engagement arm 154 in directions C, D between an engaged position and a disengaged position relative to plunger 250. In the example embodiment illustrated, engagement arm 154 is in the disengaged position when engagement arm 154 is in a raised position, disengaged from plunger 250 and is in the engaged position when engagement arm 154 is in a lowered positioned to contact plunger 250.

Engagement arm 154 is biased in an upward, bottom-to-top direction D, such as by one or more springs, such that engagement arm 154 is biased toward the disengaged position. In the embodiment illustrated, an extension spring 158 is connected between a first spring mount 157 on engagement arm 154 and a second spring mount 160 on side 109 of body 104 to continuously bias engagement arm 154 in bottom-to-top direction D. First spring mount 157 on engagement arm 154 contacts an upward stop 162 on sleeve 152 when engagement arm 154 is in the disengaged position. The biasing force of spring 158 is overcome when engagement arm 154 moves downward in top-to-bottom direction C when upper end surface 155 of engagement arm 154 receives a downward force from a feature or corresponding surface in image forming device 20 causing engagement arm 154 to move from the disengaged position to the engaged position.

Figure 13:
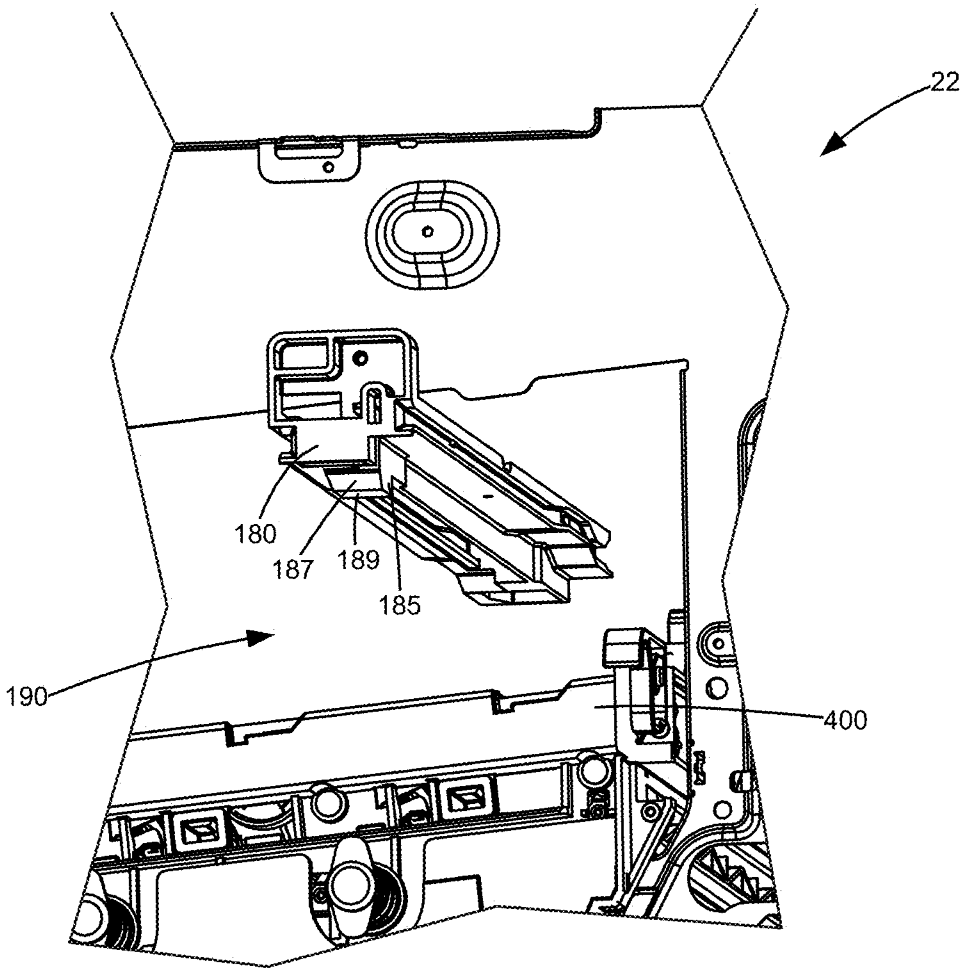
FIG. 13 is a perspective view showing an insertion guide for the toner cartridge shown in FIG. 12 positioned above a toner cartridge compartment according to one example embodiment.
Figure 14:
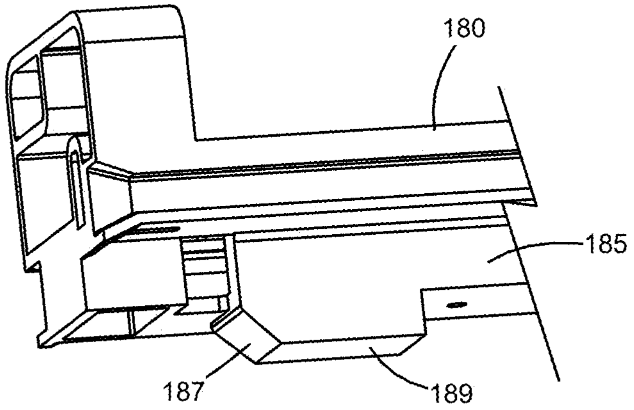
FIG. 14 is a perspective view of a cam on the insertion guide shown in FIG. 13 according to one example embodiment.

In the embodiment illustrated, upper end surface 155 of engagement arm 154 is unobstructed such that upper end surface 155 contacts a feature positioned along the insertion path of upper end surface 155 in order for engagement arm 154 to move from the disengaged position to the engaged position during insertion of toner cartridge 100 into image forming device 20. In one example embodiment, upper end surface 155 of engagement arm 154 is positioned to contact a cam 185 disposed above a toner cartridge compartment 190 for receiving toner cartridge 100, as shown in FIGS. 13 and 14. In the example embodiment illustrated, cam 185 is formed along an insertion guide 180 for toner cartridge 100 that is attached to an upper frame plate (not shown) above toner cartridge compartment 190 which, in turn, is above imaging basket 400. For purposes of clarity, only one insertion guide 180 with cam 185 is shown in FIG. 13. It will also be appreciated that latches 300 are absent in imaging basket 400 shown in FIG. 13 for this example embodiment.

In the example embodiment illustrated, cam 185 is positioned along the path of insertion of upper end surface 155 of engagement arm 154 of hold-down mechanism 150 to provide an actuation force to engagement arm 154 to move engagement arm 154 from the disengaged position to the engaged position against the biasing force of spring 158 during insertion of toner cartridge 100 into image forming device 20. In the embodiment illustrated, cam 185 includes a ramped section 187 and a dwell 189. Upper end surface 155 of engagement arm 154 is configured to travel along ramped section 187 as engagement arm 154 transitions between the disengaged position and the engaged position, as discussed below. To reduce frictional resistance between contact points, engagement arm 154 and cam 185 may be made from materials having relatively small coefficients of friction.

It will be appreciated that engagement arm 154, the mounting configuration of engagement arm 154 on body 104, and cam 185 above toner cartridge 100 illustrated are intended to serve as examples and that one or more components of hold-down mechanism 150 or cam 185 may be mounted according to any suitable configuration that permits engagement arm 154 to move between the disengaged and engaged positions. For example, sleeve 152 is shown as a separate element that is attached to body 104 in the example illustrated, but sleeve 152 may be formed as part of body 104. In another example, cam 185 is formed as part of insertion guide 180 in the example illustrated, but cam 185 may be an attached stand-alone part or a drawn area of a horizontal frame plate above toner cartridge compartment 190.

Figure 15A:
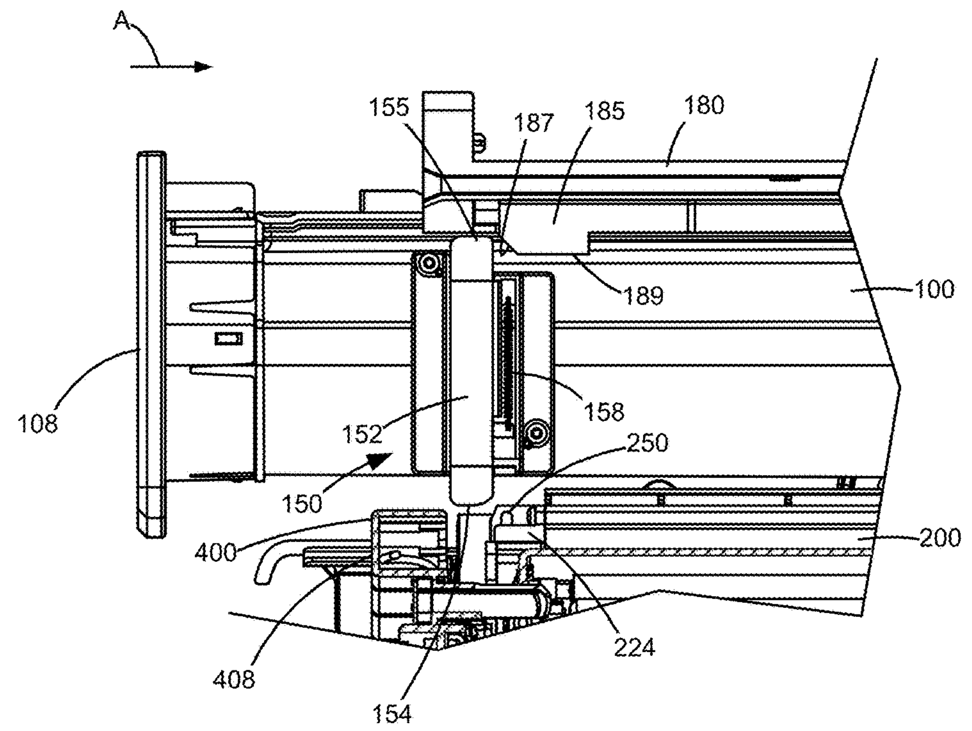
FIGS. 15A-15C are sequential side views showing the operation of the hold-down mechanism shown in FIG. 12 during insertion of the toner cartridge into the image forming device according to one example embodiment.
Figure 15B:
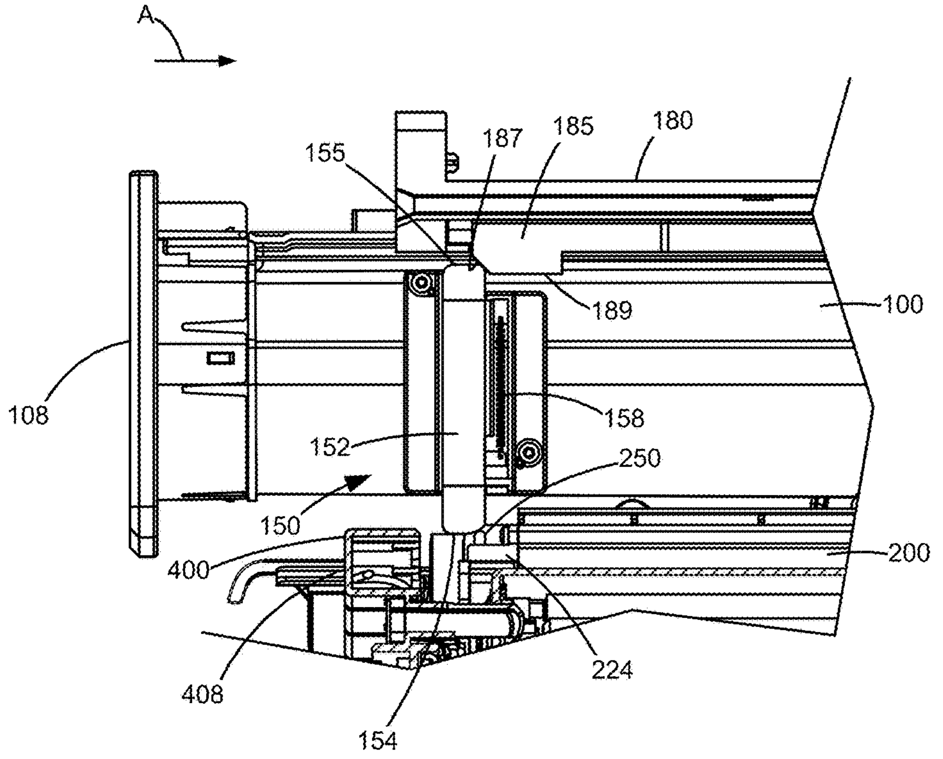
Figure 15C:
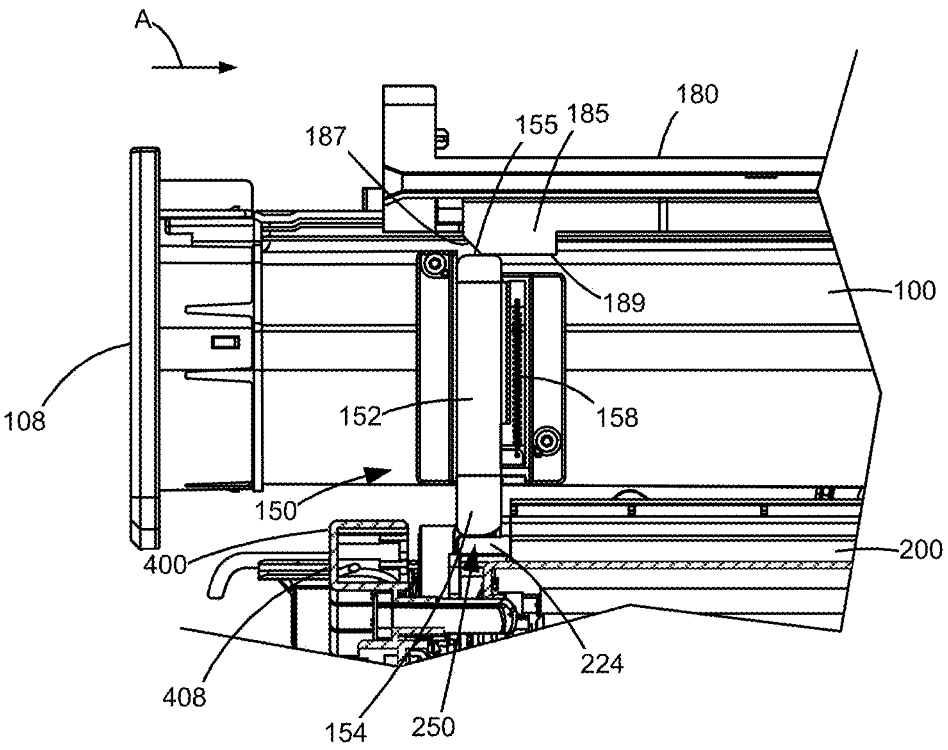

FIGS. 15A-15C illustrate the operation of hold-down mechanism 150 during insertion of toner cartridge 100 into image forming device 20 with developer unit 200 in its final installed position in image forming device 20 according to one example embodiment. The direction of insertion of toner cartridge 100 into image forming device 20 is indicated by arrow A in FIGS. 15A-15C. As discussed above, toner cartridge 100 is inserted into image forming device 20 generally along longitudinal dimension 114 of toner cartridge 100 with first end 107 of body 104 leading and second end 108 of body 104 trailing.

FIG. 15A shows toner cartridge 100 during insertion into image forming device 20 with upper end surface 155 of engagement arm 154 of hold-down mechanism 150 approaching cam 185 on insertion guide 180 and lower end surface 156 of engagement arm 154 approaching plunger 250 as toner cartridge 100 moves in direction of insertion A. Engagement arm 154 of hold-down mechanism 150 is in the disengaged position as a result of the bias applied by spring 158.

FIG. 15B shows toner cartridge 100 advanced forward in the direction of insertion A of toner cartridge 100 from the position shown in FIG. 15A. In the embodiment illustrated, upper end surface 155 of engagement arm 154 of hold-down mechanism 150 contacts cam 185 above toner cartridge 100. As toner cartridge 100 advances further forward in the direction of insertion A, upper end surface 155 of engagement arm 154 travels along ramped section 187 of cam 185 causing cam 185 to push engagement arm 154 of hold-down mechanism 150 downward against the biasing force of spring 158 and causing engagement arm 154 to move from the disengaged position toward the engaged position, which causes lower end surface 156 of engagement arm 154 to contact plunger 250 of developer unit 200.

FIG. 15C shows toner cartridge 100 in its final installed position in image forming device 20, advanced forward in the direction of insertion A of toner cartridge 100 from the position shown in FIG. 15B. In the embodiment illustrated, engagement arm 154 of hold-down mechanism 150 is held by cam 185 in the engaged position relative to plunger 250 of developer unit 200 as upper end surface 155 of engagement arm 154 rests along dwell 189 of cam 185. The force applied to plunger 250 of developer unit 200 by engagement arm 154 of hold-down mechanism 150 overcomes the bias applied to plunger 250 by biasing member 256 causing plunger 250 to be depressed by lower end surface 156 of engagement arm 154 and retract into end cap 224 of developer unit 200. In this position, engagement arm 154 and plunger 250 are firmly positioned in image forming device 20 with biasing member 256 of plunger 250 exerting an upward force that counteracts the downward force of lower end surface 156 of engagement arm 154 acting on plunger 250. In this example, engagement arm 154 floats within a range vertically relative to toner cartridge 100 such that there is substantially no net vertical reaction force against toner cartridge 100 resulting from the interaction between engagement arm 154 of hold-down mechanism 150 and plunger 250 of developer unit 200 when toner cartridge 100 is in its final installed position in image forming device 20. Instead, the vertical reaction force that is created from holding down second end 215 of developer unit 200 via plunger 250 is experienced by the structural frame of image forming device 20 onto which insertion guide 180 and cam 185 are mounted.

When toner cartridge 100 is removed from image forming device 20, the above sequence is reversed. The biasing force applied by spring 158 pulls engagement arm 154 of hold-down mechanism 150 towards the disengaged position as toner cartridge 100 moves from the position shown in FIG. 15C to the position shown in FIG. 15B. When upper end surface 155 of engagement arm 154 disengages from cam 185 as toner cartridge 100 is further removed from image forming device 20, spring 158 fully returns engagement arm 154 of hold-down mechanism 150 to the disengaged position thereby releasing plunger 250 as shown in FIG. 15A.

The example embodiments shown in FIGS. 12-15C provide a more stable hold-down force of developer unit 200 in comparison with other assemblies that include hold downs applied to the developer unit by the toner cartridge since the reaction force is not against a positionally compliant supply item but rather the structural frame of the printer. In addition, there is no residual vertical hold-down force pushing toner cartridge 100 upward in an undesirable manner, which would interfere with aesthetics, tactile feedback during installation, and proper functioning of toner cartridge 100. Further, the example embodiments permit developer units 200 to be easily dropped straight down and lifted out of their corresponding positioning slots 406 in imaging basket 400 with ample clearance by having no hold-down mechanism present on imaging basket 400 when imaging basket 400 is removed from image forming device 20. The example embodiments also achieve a more uniform hold down force regardless of part manufacturing, assembly and module placement tolerances within image forming device 20 because of the spring-biased plunger 250 on developer unit 200.

In some embodiments, if a user needs to replace a developer unit 200 in imaging basket 400, there is no need for the user to manually release developer unit 200 for removal or to reactivate the hold down force after installation of developer unit 200 since all that is needed to remove or reactivate the hold down force on developer unit 200 is for the user to remove or install toner cartridge 100. This ensures case of use and reliability, eliminating the need for users to figure out removal and installation steps nor risk omitting steps or performing the steps in an incorrect sequence.

Although the example image forming device 20 discussed above includes four toner cartridges 100 and corresponding developer units 200 and PC units 80, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot; and a latch positioned at the first side of the basket, the latch is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket, wherein the latch includes a hold-down member extending towards the positioning slot for applying the hold-down force on the end portion of the developer unit, wherein the hold-down member is positioned on the latch such that the hold-down member applies the hold-down force in a linear direction that passes through the pivot axis when the developer unit is positioned in the positioning slot and the latch is in the latched position.

2. The system of claim 1, further comprising a spring-biased plunger positioned at the end portion of the developer unit for receiving the hold-down force from the latch when the developer unit is positioned in the positioning slot and the latch is in the latched position.

3. The system of claim 1, wherein the hold-down member is positioned along a vertical insertion path of the developer unit that is orthogonal to the longitudinal dimension when the latch is in the latched position, and the hold-down member is clear of the vertical insertion path of the developer unit when the latch is in the unlatched position.

4. The system of claim 1, wherein the latch includes a handle extending away from the positioning slot for receiving a user-applied force for actuating the latch.

5. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot, the positioning slot is configured to receive the developer unit along a vertical insertion path of the developer unit into the positioning slot that is orthogonal to the longitudinal dimension; and a latch positioned at the first side of the basket, the latch is movable between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket;

a spring-biased plunger positioned at the end portion of the developer unit for contacting the latch and receiving the hold-down force from the latch when the developer unit is positioned in the positioning slot and the latch is in the latched position, wherein a portion of the latch is positioned along the vertical insertion path of the developer unit when the latch is in the latched position and the portion of the latch is clear of the vertical insertion path of the developer unit when the latch is in the unlatched position.

6. The system of claim 5, wherein the portion of the latch extends toward the positioning slot for applying the hold-down force on the end portion of the developer unit when the developer unit is positioned in the positioning slot and the latch is in the latched position.

7. The system of claim 5, wherein the latch is pivotable between the latched position and the unlatched position about a pivot axis.

8. The system of claim 7, wherein the portion of the latch is positioned on the latch such that the portion applies the hold-down force in a linear direction that passes through the pivot axis when the developer unit is positioned in the positioning slot and the latch is in the latched position.

9. The system of claim 5, wherein the latch includes a handle extending away from the positioning slot for receiving a user-applied force for actuating the latch.

10. The system of claim 9, wherein the handle is offset from the portion of the latch relative to a direction of motion of the latch to provide a moment arm such that a moment force is generated to facilitate release of the latch from the latched position to the unlatched position when the handle receives the user-applied force.

11. The system of claim 9, wherein an insertion path of a toner cartridge configured to supply toner to the developer unit is positioned above the positioning slot, the handle blocks the insertion path preventing installation of the toner cartridge into the image forming device when the latch is in the unlatched position and the handle is clear of the insertion path permitting installation of the toner cartridge into the image forming device when the latch is in the latched position.

12. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot; and a latch positioned at the first side of the basket, the latch is movable between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket, wherein an insertion path of a toner cartridge configured to supply toner to the developer unit is positioned above the positioning slot, and a portion of the latch blocks the insertion path preventing installation of the toner cartridge into the image forming device when the latch is in the unlatched position and the portion of the latch is clear of the insertion path permitting installation of the toner cartridge into the image forming device when the latch is in the latched position.

13. The system of claim 12, further comprising a spring-biased plunger positioned at the end portion of the developer unit for receiving the hold-down force from the latch when the developer unit is positioned in the positioning slot and the latch is in the latched position.

14. The system of claim 12, wherein the latch includes a hold-down member extending towards the positioning slot for applying the hold-down force on the end portion of the developer unit when the developer unit is positioned in the positioning slot and the latch is in the latched position.

15. The system of claim 14, wherein the hold-down member is positioned along a vertical insertion path of the developer unit into the positioning slot that is orthogonal to the longitudinal dimension when the latch is in the latched position and the hold-down member is clear of the vertical insertion path of the developer unit when the latch is in the unlatched position.

16. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot;

a latch positioned at the first side of the basket, the latch is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket; and a spring-biased plunger positioned at the end portion of the developer unit for receiving the hold-down force from the latch when the developer unit is positioned in the positioning slot and the latch is in the latched position.

17. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot; and a latch positioned at the first side of the basket, the latch is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket, wherein the latch includes a hold-down member for applying the hold-down force on the end portion of the developer unit, the hold-down member is positioned along a vertical insertion path of the developer unit that is orthogonal to the longitudinal dimension when the latch is in the latched position, and the hold-down member is clear of the vertical insertion path of the developer unit when the latch is in the unlatched position.

18. A system for an electrophotographic image forming device, comprising:

a basket having a first side, a second side, and a positioning slot, the positioning slot is configured to receive a developer unit having a longitudinal dimension that extends along a length of the positioning slot from the first side to the second side when the developer unit is positioned in the positioning slot; and a latch positioned at the first side of the basket, the latch is pivotable about a pivot axis that is parallel to the longitudinal dimension between a latched position for applying a hold-down force on an end portion of the developer unit when the developer unit is positioned in the positioning slot to rigidly hold the end portion of the developer unit against the basket and an unlatched position to release the end portion of the developer unit permitting removal of the developer unit from the basket, wherein the latch includes a handle extending away from the positioning slot for receiving a user-applied force for actuating the latch.

19. The system of claim 18, wherein the latch includes a hold-down member extending towards the positioning slot for applying the hold-down force on the end portion of the developer unit, the handle is offset from the hold-down member relative to a rotational direction of motion of the latch to provide a moment arm such that a moment force is generated to facilitate release of the latch from the latched position to the unlatched position when the handle receives the user-applied force.

20. The system of claim 18, wherein an insertion path of a toner cartridge configured to supply toner to the developer unit is positioned above the positioning slot, the handle blocks the insertion path preventing installation of the toner cartridge into the image forming device when the latch is in the unlatched position and the handle is clear of the insertion path permitting installation of the toner cartridge into the image forming device when the latch is in the latched position.

* * * * *